United States Patent [19]

Turnbach

[11] Patent Number: 5,686,526
[45] Date of Patent: Nov. 11, 1997

[54] PROCESS OF MAKING MOLDED POLYURETHANE ARTICLES

[75] Inventor: James Turnbach, Madison Heights, Mich.

[73] Assignee: BASF Corporation, Mt. Olive, N.J.

[21] Appl. No.: 572,460

[22] Filed: Dec. 14, 1995

[51] Int. Cl.$^6$ .................................................. C08G 18/50
[52] U.S. Cl. ............... 524/731; 524/774; 524/775; 528/26.5; 528/28; 528/78; 428/425.6; 264/46.5; 521/110; 521/112
[58] Field of Search .................... 524/731, 775, 524/774; 528/26.5, 28, 78; 428/425.6; 264/46.5; 521/110, 112

[56] References Cited

U.S. PATENT DOCUMENTS

| | | | |
|---|---|---|---|
| 3,772,222 | 11/1973 | Steward et al. | 521/110 |
| 3,875,069 | 4/1975 | Worschech et al. | 252/565 |
| 4,052,495 | 10/1977 | Uhlmann et al. | 264/216 |
| 4,076,660 | 2/1978 | Olstowski et al. | 528/85 |
| 4,111,861 | 9/1978 | Godlewski | 521/123 |
| 4,457,887 | 7/1984 | Porsche | 264/300 |
| 4,477,366 | 10/1984 | Robertson | 252/182 |
| 4,498,929 | 2/1985 | Robertson | 106/38.2 |
| 4,499,254 | 2/1985 | Dominguez et al. | 528/49 |
| 4,504,314 | 3/1985 | Barker et al. | 106/38.35 |
| 4,546,145 | 10/1985 | Robertson | 525/474 |
| 4,562,290 | 12/1985 | Korczak | 564/399 |
| 4,681,926 | 7/1987 | Goel | 528/48 |
| 4,708,971 | 11/1987 | Goel et al. | 521/167 |
| 4,722,946 | 2/1988 | Hostettler | 521/158 |
| 4,769,174 | 9/1988 | Kilgour | 252/351 |
| 4,769,204 | 9/1988 | Oba et al. | 264/300 |
| 5,073,576 | 12/1991 | Kuyzin | 521/99 |
| 5,389,696 | 2/1995 | Dempsey et al. | 521/128 |

FOREIGN PATENT DOCUMENTS

| | | |
|---|---|---|
| 0231523 | 8/1987 | European Pat. Off. |
| 58-42613 | 4/1983 | Japan . |
| 3-110109 | 5/1991 | Japan . |
| 05025339 | 2/1993 | Japan . |
| 06032983 | 2/1994 | Japan . |
| 6-246760 | 9/1994 | Japan . |
| 7-41626 | 2/1995 | Japan . |

*Primary Examiner*—Rachel Gorr
*Attorney, Agent, or Firm*—Fernando A. Borrego

[57] ABSTRACT

The invention provides polyurethane components and compositions capable of providing internal mold release properties in SRIM applications. The polyol composition of the invention has an isocyanate reactive polyol (A) having a number average molecular weight from 100 to about 10,000 and an effective amount of internal mold release composition (B) having a silicon-containing polymer (a) and an at least diester functional compound (b) which is the reaction product of (i) an aromatic carboxylic acid, and (ii) alcohols having from 2 to 30 carbons. The invention further provides an SRIM polyurethane composition useful in the preparation of molded polyurethane articles having internal mold release properties, the composition comprising an isocyanate component (I) and the isocyanate reactive polyol composition (component (II)) disclosed above. In another aspect of the invention, the invention provides methods of using the claimed compositions as well as the rigid cellular polyurethane SRIM articles resulting from such processes.

20 Claims, No Drawings

PROCESS OF MAKING MOLDED POLYURETHANE ARTICLES

1. BACKGROUND OF THE INVENTION

The present invention relates to molded, cellular, polyurethane articles having internal mold release capabilities, compositions for use in the preparation of such articles, and methods of making such articles. More particularly, the invention relates to rigid, cellular molded polyurethane articles produced by structural reaction injection molding (SRIM) processes. The molded articles of the invention may be characterized as having densities ranging from 15 to 40 pcf. Most particularly, the invention relates to rigid, cellular polyurethane SRIM articles having fiberglass reinforcement therein, the articles having internal mold release capabilities.

Molded cellular and noncellular polyurethane articles have found many applications in the automotive and building industries. Illustrative automotive applications include the use of such articles as consoles, door panels, pillars and seat backs. Examples of non-automotive uses include modular housing and shower supports and doors. Although many polyurethane molded parts are produced by reaction injection molding processes (RIM), it has been found that the use of woven or non-woven fiber reinforcements can provide parts with greater tensile strength and flex modulus. Such molding processes are known as structural reaction injection molding (SRIM).

SRIM processes may be generally described as the pouring or injecting of a liquid foam composition into a closed or open mold which, if open, is subsequently closed during the foaming reaction. Prior to the pouring in of the liquid foam composition, reinforcing fiberglass mats and/or other suitable plastic reinforcing parts are placed in the open mold. In some cases, a cosmetic facing or cover stock material will initially be laid in the open mold prior to the placement of the reinforcing materials and/or liquid foaming composition. When such cover stock materials are used, and the liquid foam composition is subsequently poured into the partially filled mold, the process is known as a back filling or pour-behind SRIM process.

Although SRIM molders are faced with problems unique to their particular processes, they are also faced with the problems attendant to any traditional polyurethane molding process. In any molding operation, efficiency and cost considerations mandate that the length of time required to make each part be minimized as much as possible. As a result, it is highly desirable that each part be removed from the mold as rapidly and as easily as possible.

However, those skilled in the art will appreciate that molded polyurethane parts often resist release from the mold. Traditionally, external mold release (EMR) agents have been applied onto the mold surface each time a new part is to be molded. The use of such EMR agents is highly disadvantageous for two reasons. First, the use of the EMR agents adds significantly to the per part cost. Factors such as the cost of the EMR agent per application, the cost of the labor or equipment required to apply the EMR agent, and the cost of the time during which the mold is open but is nonfunctioning, must all be included when evaluating the additional cost per part resulting from the use of EMR agents. Second, the EMR agents often include volatile components which result in a need for air cleaning and/or ventilation equipment. Fans, blowers, and protective gear all represent a significant capital investment. As a result, polyurethane molders have long desired internal mold release (IMR) agents which are mixed with one or more of the polyurethane components and are thus present during each molding cycle. Such internal mold release agents are intended to appear at the interface between the mold wall cavity and the reacting ingredients to effect sufficient non-adherence between the two so that release and removal of the molded article can be easily accomplished.

Examples of previous prior art attempts to provide IMR agents are disclosed in several U.S. patents. Illustrative is U.S. Pat. No. 4,111,861, which discloses compositions and methods for forming polyether polyurethanes utilizing internal mold release additives selected from four disclosed classes, i.e., (1) mixtures of aliphatic or aryl carboxylic acid and a polar metal compound, (2) carboxyalkylsiloxanes, (3) aliphatic glyoximes, and (4) aralkyl quaternary ammonium salts.

U.S. Pat. No. 3,875,069 discloses lubricant compositions useful in the shaping of thermoplastic materials comprising a mixture of (A) mixed esters of aliphatic polyols, dicarboxylic acids and long chained aliphatic monocarboxylic acids, and (B) esters of the groups: (1) esters of dicarboxylic acids and long chained aliphatic monofunctional alcohols, (2) esters of long chained aliphatic monocarboxylic acids, (3) complete or partial esters of aliphatic polyols and long chained aliphatic monocarboxylic acids, in a ratio of (A) to (B) of from 1:3 to 9:1.

U.S. Pat. Nos. 4,052,495 and 4,457,887, assigned to Dow Corning Corporation, respectively disclose siloxane-polyoxyalkylene copolymers and silicones intended for use as internal mold release agents in the molding of polyurethanes articles.

Similarly, U.S. Pat. Nos. 4,498,929, 4,546,145, 4,504, 314, and 4,477,366, assigned to ICI, disclose internal mold release agents incorporating particular polysiloxane compounds.

However, very few prior art attempts at providing internal mold release agents have been successfully directed towards SRIM applications. The process of molding SRIM articles provides unique challenges to the successful incorporation of IMR agents. The use of the IMR agents must not interfere with or detract from the internal adhesion of the polyurethane composition to internal components like the fiberglass mat and/or polymer based structural reinforcing elements. Likewise, the IMR agent on the exterior surface of the finished SRIM article must not interfere with adhesion between the article and external components like cover stocks used in a pour-behind SRIM applications. Finally, the use of the IMR agents must not interfere with the flow characteristics or reactivity profile of the polyurethane composition. Those skilled in the art will appreciate that the polyurethane compositions used in SRIM applications must exhibit superior flowability and generally low viscosity in order to accommodate the presence of the reinforcing materials.

In addition to the performance requirements of the finished SRIM article, those skilled in the art will appreciate that it would be highly desirable to achieve polyol compositions capable of providing internal mold release properties which exhibit minimal separation behavior upon standing. Those skilled in the art will appreciate that IMR agents often exhibit separation behavior when combined in either the polyol component or the isocyanate component of a polyurethane composition. Such separation behavior represents special processing challenges and often requires the use of costly processing and/or mixing equipment.

It is thus an object of the invention to provide an internal mold release agent which is capable of use in SRIM compositions and applications and which reduces the need to apply EMR agents.

It is a further object of the invention to provide a polyol composition having an internal mold release agent therein which exhibits minimal separation behavior and which, when used in SRIM applications, provides rigid, cellular polyurethane articles exhibiting good adhesion to both internal and external components. It is a further object of the instant invention to provide a foam composition for the preparation of molded polyurethane articles having internal mold release properties, wherein the polyol component of the composition exhibits little or no separation behavior and the composition results in rigid, cellular polyurethane articles exhibiting good adhesion to both internal and external component elements.

Finally, it is an object of the invention to provide improved methods of making SRIM articles, wherein the articles have internal mold release properties and the need to apply EMR agents is reduced.

2. SUMMARY OF THE INVENTION

These objects and more are satisfied with the compositions of the invention. The internal mold release composition and the polyol composition of the invention are capable of providing internal mold release properties to an SRIM polyurethane system and reducing the need for EMR agents.

The internal mold release composition of the invention includes a silicon-containing polymer (a) and an at least diester functional compound (b) which is the reaction product of (i) an aromatic dicarboxylic acid, and (ii) alcohols having from 2 to 30 carbons.

The polyol composition of the invention requires an isocyanate reactive polyol (A) having a molecular weight from 100 to about 10,000 and an effective amount of an internal mold release composition (B) having a silicon containing polymer (a) and an at least diester functional compound (b) which is the reaction product of (i) an aromatic dicarboxylic acid, and (ii) alcohols having from 2 to 30 carbons.

The invention further provides a composition useful in the preparation of molded polyurethane articles having internal mold release properties, the composition comprising an isocyanate component (I), and an isocyanate reactive polyol component (II) requiring an isocyanate reactive polyol (A) having a molecular weight from 100 to about 10,000 and an effective amount of an internal mold release composition (B) requiring a silicon containing polymer (a) and an at least diester functional compound (b) which is the reaction product of (i) an aromatic dicarboxylic acid, and (ii) alcohols having from 2 to 30 carbons.

It has been found that use of the polyol component and polyurethane composition as disclosed herein provides several advantages. Significant improvements in productivity and a decrease in overall cycle time have been realized. More particularly, demold times of SRIM articles have been realized which are less than one minute and in some cases less than 50 seconds. In addition, it has been found that little or greatly reduced amounts of external mold release agent are required. Finally, molds appear to be easier to clean when the compositions of the invention are used.

The invention also provides methods of utilizing the disclosed polyol and polyurethane compositions as well as the articles produced by such methods.

In particular, the invention provides a process of making a molded polyurethane article having internal mold release properties, the method requiring the providing of a mold; placing in the mold, a composition comprising an isocyanate component (I) and an isocyanate reactive polyol component (II), component (II) requiring an isocyanate reactive polyol (A) having a molecular weight from 100 to about 10,000, as well as an effective amount of an internal mold release composition (B), composition (B) having an silicon-containing polymer (a) and an at least diester functional compound (b) which is the reaction product of (i) an aromatic dicarboxylic acid, and (ii) alcohols having from 2 to 30 carbons; and allowing the composition to react within the mold for a time sufficient to produce a molded polyurethane article having internal mold release properties.

Finally, the invention provides a method a making a composite molded article, the method requiring placing a cover stock within a composite article mold; subsequently placing within the composite article mold a molded polyurethane SRIM article having internal mold release properties, the SRIM article being produced by a process requiring providing an SRIM article mold, placing in the SRIM article mold, an SRIM composition having an isocyanate component (I), and an isocyanate reactive polyol component (II), component (II) having an isocyanate reactive polyol (A) and an effective amount of an internal mold release composition (B), composition (B) having an silicon-containing polymer (a) and an at least diester functional compound (b) which is the reaction product of (i) an aromatic dicarboxylic acid, and (ii) alcohols having from 2 to 30 carbons, allowing the composition to react within the SRIM article mold for a time sufficient to produce a molded polyurethane SRIM article having internal mold release properties, and removing the article from the SRIM article mold; providing within the composite article mold, a polyurethane foam composition; and allowing the polyurethane foam composition to react within the composite article mold for a time sufficient to produce a composite molded article.

3. DETAILED DESCRIPTION OF THE PREFERRED EMBODIMENT

The polyurethane composition of the invention requires an isocyanate component (I) and an isocyanate reactive polyol component (II). Isocyanate reactive polyol component (II) must, at a minimum, have an isocyanate reactive polyol (A) having a molecular weight from 100 to about 10,000 and an effective amount of internal mold release composition (B).

Internal mold release composition (B) requires a silicon-containing polymer (a) and an at least diester functional compound (b) which is the reaction product of (i) an aromatic dicarboxylic acid, and (ii) alcohols having from 2 to 30 carbons. It has been found that the combination of components (a) and (b) exhibits synergism and provides unexpected advantageous internal mold release properties to SRIM articles and molding processes. The particular combination of (a) and (b), in the disclosed proportions, provides advantageous release results as compared to the performance of (a) or (b) alone.

The silicon-containing polymer (a) will generally be a silicone, i.e. a polymer containing the moiety —Si(R₂)O—. The silicon-containing polymer (a) preferably utilized in the invention contains two or more secondary hydroxyl groups, and preferably an average of three hydroxyl groups per silicon-containing polymer molecule. In a particularly preferred aspect of the invention, the silicon-containing polymer is a dimethylsiloxane compound which is represented by the following generic formula:

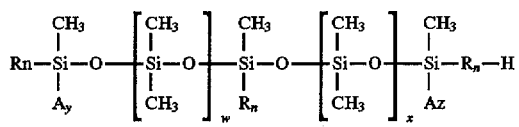

wherein
  each of R are independently an alkyl radical having 1 to 20 carbon atoms; an alicyclic, an aryl, an alkaryl or an aralkyl having 1 to 25 carbon atoms in the alkyl group; an aliphatic ether group; or a polyester group; and wherein a secondary hydroxyl functional group is substituted onto at least two, preferably onto each of the R groups;

each of A are independently one or more silicon atoms containing alkyl, alicyclic, cycloalkyl, aryl, alkyloxy, alkaryl, aralkyl, or arylalkoxy have a 1 to 25 carbon atoms in each aliphatic portion; an organosiloxane; hydrogen; or an alkyl having 1 to 25 carbon atoms;

n is an integer from 1 to 10; and the sum of w+x+y+z totals an integer which would correspond to an average hydroxyl equivalent weight ranging from 200 to 4,000.

Preferably, each of R are independently an alkyl having from 1 to 10 carbon atoms, an alkoxy, or an ether having the formula:

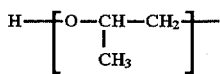

and preferably A is hydrogen, a C₁–C₄ alkyl, or a siloxane having the formula:

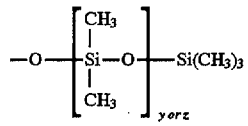

wherein n is an integer from 1 to 6, and w+x+y+z totals an integer corresponding to an average hydroxyl equivalent weight of the molecule ranging from 1,250 to 3,000.

In the most preferred embodiment of the invention, the silicon-containing polymer (a) used in the invention will be Dow Corning®[1] 1248 fluid, sold by Air Products of Allentown, Pa. or any commercially available equivalent. A commercially available equivalent is believed to be DABCO®[2] DC5000. The 1248 fluid has an average of 3 hydroxyl sites per molecule and an average hydroxyl equivalent weight of about 1,725 to 2,225, and most likely about 2,000. It is believed that this fluid corresponds with the formula:

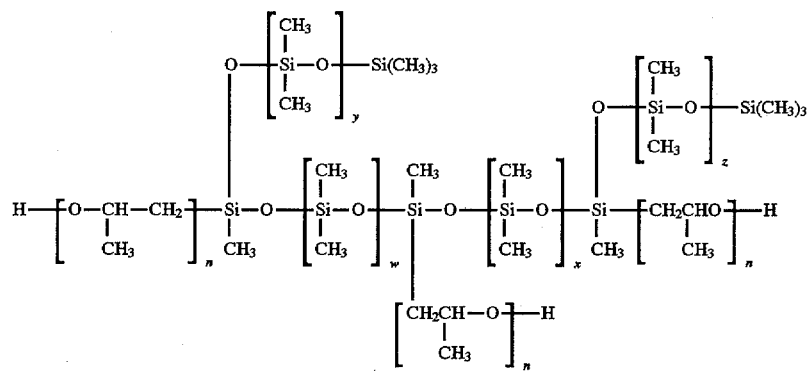

wherein each n is independently an integer ranging from 1 to 4, and w+x+y+z is about 70, or corresponds to average hydroxyl equivalent weight of a molecule of about 2,000. The methods of manufacture of such silicon-containing polymers is generally described in U.S. Pat. No. 4,130,708, the disclosure of which is hereby incorporated by reference.

[1]Dow Corning is a registered trademark of Dow Corning Corporation.
[2]DABCO is a registered trademark of Air Products Corporation.

The second component of the internal mold release composition of the invention is an at least diester functional compound (b) which is a reaction product of (i) an aromatic dicarboxylic acid and (ii) alcohols having from 2 to 30 carbons.

The aromatic dicarboxylic acids (i) will generally have from between 8 to 14 carbon atoms. The aromatic dicarboxylic acids may be mononuclear or polynuclear. Examples of suitable mononuclear aromatic dicarboxylic acids are phthalic acid, terephthalic acid and isophthalic acid. Examples of suitable polynuclear aromatic dicarboxylic acids include naphthalic acid and diphenyl-o,o'-dicarboxylic acid. Mononuclear aromatic dicarboxylic acids are preferred. Especially preferred is phthalic acid.

The second reactant used in making the at least diester functional compound (b) is an alcohol (ii) having from 2 to 30 carbons. A wide variety of alcohols are suitable for use in producing compound (b). Preferred alcohols are aliphatic monofunctional alcohols. The alcohols may be linear, branched or even to highly branched oxo alcohols. Linear alcohols are most suitable. Aliphatic monofunctional alcohols having from 2 to 30 carbons are preferred. More preferred are aliphatic monofunctional alcohols having from 4 to 15 carbons. Most preferably, the aliphatic monofunctional alcohols (i) will have from 8 to 11 carbons. Examples of suitable monofunctional aliphatic alcohols include ambutyl alcohol, isobutyl alcohol, isohexyl alcohol, 1,3'-dimethylbutyl alcohol, heptyl alcohol, octyl alcohol, 2-ethylhexyl alcohol, isooctyl alcohol, oxo alcohol, dodecyl alcohol, undecyl alcohol, tridecyl alcohol, isotridecyl alcohol, tetradecyl alcohol, hexadecyl alcohol, isohexyldecyl alcohol, styro alcohol, and behenyl alcohol, alcohols of 12 to 30 carbons such as oleyl alcohol, as well as alcohol mixtures that are obtained by hydrogenating fatty acid mixtures of 12 to 30 carbon atoms obtained from natural fats and oils, such as olive oil, grapeseed oil, coconut oil, palm oil, soybean oil, cottonseed oil, and linseed oil.

The alcohols (i) used to react with the aromatic dicarboxylic acid (i) may be a single suitable alcohol or may be a mixture of 2 or more suitable alcohols. It will be appreciated that the use of a single suitable alcohol will result in the formation of diesters (b) having a structure (R'OOCRCOOR") wherein R is an aromatic structure and R' and R" are identical. The use of two or more suitable alcohols will result in compounds (b) having a structure (R'OOCRCOOR") wherein R is an aromatic structure and R' and R" are nonidentical. While it is possible to use mixtures of various monofunctional alcohols, it is most preferred that a single alcohol be used such that diesters of identical structure, i.e. R'OOCRCOOR', are formed. However, it is within the scope of the invention to use esters (b) wherein R' and R" are different.

Particularly preferred reactants for use in making the at least diester functional compound (b) are phthalic acid and undecyl alcohol. Accordingly, a particularly preferred at least diester functional compound (b) is di-undecyl phthalate or DUP.

The reactants (i) and (ii) will generally be reacted in a manner known to those skilled in the art. That is, the production of the at least diester functional compounds (b) are effected according to known esterification methods, for example, esterifying the hydroxyl groups of the alcohols (ii) with the aromatic dicarboxylic acids (i) to produce complete esterification. In general, one mole of the dicarboxylic acid (i) will be reacted with two moles of the monofunctional alcohols, (ii).

As indicated above, it has unexpectedly been found that the combination of (a) and (b) provides unexpectedly advantageous internal mold release properties. As a result, at a minimum, the internal mold release composition (B) will have from 1 to 99 parts by weight of the silicon-containing polymer (a) and from 99 to 1 parts by weight of the compound (b), all parts by weight being based on the total weight of the internal mold release composition (B).

More particularly, it has been found that good internal mold release properties are obtained when the IMR composition (B) contains from 1 to 50 parts by weight of the silicon-containing polymer (a), and from 50 to 99 parts by weight of the at least diester functional compound (b).

Optimum internal mold release properties have been achieved where the internal mold release composition (B) contains from 1 to 15 parts by weight of the silicon-containing polymer (a) and from 85 to 99 parts by weight of compound (b).

In general, the polyol composition (II) of the invention (also known as the resin side or polyol component) should contain from about 10 to 60 weight percent of the internal mold release composition (B) based on the total weight of the polyol composition. That is, out of 100 pounds of a polyol composition, comprised of a mixture of isocyanate-reactive polyol (A) and internal mold release composition (B), from 10 to 60 pounds should be IMR composition (B) while from 90 to 40 pounds is isocyanate-reactive polyol (A). Those skilled in the art will appreciate that increasing amounts of the internal mold release composition (B) will provide the best release properties while increasing amounts of the isocyanate reactive polyol (A) will generally provide the best overall performance properties in the finished molded polyurethane SRIM articles.

It has been found that ideally, the internal mold release composition (B) will be present in a weight ratio of approximately 1 parts IMR agent (B) to 2 parts polyol (A). That is, in a total of 99 parts by weight of the polyol composition of the invention (i.e. polyol component (II)), 33 parts by weight will be internal mold release composition (B), while 66 pounds are comprised of isocyanate reactive polyol (A).

Examples of suitable isocyanate reactive polyols (A) are compounds having at least two isocyanate reactive hydrogens which are intended to be employed in the preparation of polyurethane foams and elastomers. Such compounds are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters and polycarbonates, polyoxyalkylene polyether polyols such as the aforementioned polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino groups and an SH group may be used. Generally, the number average molecular weight of the polyols will vary from greater than 400 to 10,000. It has been found, however, that nitrogen containing molecules, particularly those with amino groups, are preferred initiators.

Suitable hydroxy-terminated polyester may be used such as those prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, β-hydromuconic acid, a-butyl-a-ethyl-glutaric acid, a,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, and sorbitol. Any suitable alkylene oxide may be used such as those disclosed above for preparing the prepolymers. Examples of alkylene oxides include ethylene oxide, propylene oxide, butylene oxide, amylene oxide, mixtures thereof, tetrahydrofuran, alkylene oxide-tetrahydrofuran mixtures, epihalohydrins, and aralkylene oxides such as styrene oxide. Polyethers which are particularly suitable include the alkylene oxide addition products of trimethylolpropane, glycerin, propylene glycol, dipropylene glycol; sucrose and blends thereof having number average molecular weights of from 100 to 5,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous having an acid equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

As indicated above, polyols having initiator molecules containing nitrogen are particularly suitable for use in the invention. Particularly preferred for use in the invention are the polyethers resulting from the condensation of amines with alkylene oxides. Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene (TDA) and mixtures of the isomers; and aliphatic amines such as methylamine, triisopropanolamine, ethylenediamine, 1,3-diaminopropane, 1,3-diaminobutane, and 1,4-diaminobutane. Polyethers having aromatic amines as initiator molecules are most preferred.

Polyols containing ester groups can also be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Polyols containing graft polymer dispersions may also be employed in the invention. These are prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, a-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substitute styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl a-ethoxyacrylate, methyl a-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2 methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 70 percent, preferably from 30 percent to 45 percent, based on the total weight of the product. The polymerization occurs at a temperature between about 25° C. and 180° C., preferably from 80° C. to 135° C.

The unsaturated polyols or macromers which may be employed in preparing a graft polymer dispersion, if used, may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether).

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cuanene hydroperoxide, paramenthane hydroperoxide, diacetyl peroxide, di-a-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, a-methylbenzyl hydroperoxide, a-methyl-a-ethyl benzyl hydroperoxide, tetralin hydroperoxide, triphenylmethyl hydroperoxide, diphenylmethyl hydroperoxide, a,a'-azobis-(2-methyl heptonitrile), 1,1'-azo-bis (cyclohexane carbonitrile), 4,4'-azo-bis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane,2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isocutyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, 2-t-butylazo-2-cyano-butane and lauroyl peroxide. Generally, from about 0.1 percent to about 10 percent, preferably from about 1 percent to about 4 percent, by weight of initiator based on the weight of the monomer will be employed in the process of the invention.

However, while many of the above described polyols are suitable for use in the invention, it has been found that certain polyols are particularly preferred. It has been unexpectedly discovered that problems of nonhomogeneity, or separation behavior, are largely eliminated when the isocyanate reactive polyol comprises at least one polyoxyalkylene polyether which has as an initiator molecule, an amine substituted aromatic molecule. Preferred examples are aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene (TDA). The most preferred type of aromatic polyamine initiator is diaminotoluene having vicinal amino groups, i.e., 2,3- or 2,6- diaminotoluene and mixtures thereof.

In addition, the most preferred polyoxyalkylene polyethers for use in the instant invention will be those which have been oxypropylated.

Thus, the preferred polyol for use in the instant invention will be an oxypropylated TDA polyether. The most preferred such polyols will generally have a relatively low molecular weight, i.e. below 1,000 and a hydroxyl number of generally less than 600. An example of a most preferred commercially available polyol is PLURACOL® Polyol 736 from BASF Corporation of Wyandotte, Mich.[3]

[3]PLURACOL® is a registered trademark of BASF Corporation.

While not wishing to be bound to a particular mechanism, it is believed that the structure of the oxypropylated aromatic polyamine polyether is responsible for the observed lack of separation in the novel polyol composition of the invention.

The polyol side or composition (II) of the invention may further contain additional components such blowing agents, catalysts, chain extending agents, surface active agents, adhesion promoters, stabilizers, dyes, fillers, pigments and/or mixtures thereof.

For example, a particularly preferred blowing agent is water, preferably 0.5 to 10 percent by weight, and more particularly, 1 to 5 weight percent of water based on the weight of the polyol (A). Alternatively, instead of water alone, mixtures of water and chemically inert, low boiling hydrocarbons or halogenated hydrocarbons can also be used as foaming agents. Suitable hydrocarbons and halogenated hydrocarbons will be those having boiling points below 50° C., preferably between 50° C. and 30° C. at atmospheric pressure. Illustrative examples are halogenated hydrocarbons such as monochlorodifloromethane, dichloromonofloromethane, dichlorofloromethane, and trichlorofloromethane and are mixtures, as well has hydrocarbons such as isomers of propane, butane, pentane as well as dimethylether.

The required quantities of blowing agent mixture can be determined experimentally in a very simple matter as a function of the mixing ratio of water to hydrocarbon blowing agents as well as the desired densities of the foam. Suitable amounts generally range from approximately 2 to 40, preferably 5 to 25 percent blowing agent based on the weight of the polyol.

Chain extending agents and/or crosslinking agents will also preferably be employed in the preparation of the molded polyurethane articles. Examples of suitable chain extenders and/or crosslinking include those compounds having at least two functional groups bearing active hydrogen atoms such as water, hydrazine, primary and secondary diamines, amino alcohols, amino acids, hydroxy acids, glycols, or mixtures thereof. Such agents will generally have a number average molecular weight of less than about 400. A preferred group of chain extending agents and/or crosslinking agents include water, ethylene glycol, 1,4-butanediol, glycerin and mixtures thereof. The most preferred crosslinking agent is glycerin.

The use of catalysts is highly preferred. Examples of suitable amine-based catalysts which may be used include tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are the metal-based catalysts, for example, stannous chloride, dibutyltin di-2-ethyl hexanoate, stannous oxide, as well as other organometallic compounds such as are disclosed in U.S. Pat. No. 2,846,408. Preferred catalysts however, are those commercially available amine catalysts such as DABCO® TMR-3, DABCO® BL-17, DABCO® X-8154, and DABCO® 33LV, all of which are commercially available from Air Products Corporation. A particularly suitable metal-based catalyst is dioctyltin dimercaptin commercially available as FOMREZ® UL-32 catalyst. The most preferred catalyst will be a mixture of amine- and metal-based catalysts.

Surfactants will also preferably be incorporated with the invention. A particularly preferred surfactant is L-550, a cell stabilizing surfactant, commercially available from Union Carbide. It is believed that the presence of this surfactant provides improved flow characteristics.

As indicated above, the IMR composition (B) will most preferably be part of the polyol component (II) of a polyurethane system. However, it is within the scope of the invention to have IMR composition (B) incorporated in the isocyanate component (I) of a polyurethane system. Alternatively, components (a) and (b) of IMR composition (B) could respectively be separately incorporated into polyol component (II) and isocyanate component. (I) In either case, the concentrations of (a) and (b) would be as given above.

The isocyanate reactive polyol component (II) of the invention is generally combined with an isocyanate component (I) to provide the polyurethane compositions of the invention. The polyurethane compositions of the invention are suitable for the preparation of molded SRIM polyurethane articles having internal mold release properties. Isocyanate components (I) suitable for use in accordance with the invention are organic isocyanates. The organic polyisocyanates employed in the instant invention correspond to the formula R'(NCO)z wherein R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-dissocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatooctane, 1,5-diisocyanato-2,2,4-trimethylpentane, 1,9-diisocyanatononame, 1,10-diisocyanatopropyl ether of 1,4-butylene glycol, 1,11-diisocyanatoundecane, 1,12-diisocyanatododecane, bis(isocyanatohexyl)sulfide, ,4-diisocyanatobenze, 1,3-diisocyanato-o-xylene, 1,3-diisocyanato-p-xylene, 1,3-diisocyanato-m-xylene, 2,4-diisocyanto-1-chlorobenzene, 2,4-diisocyanato-1-nitro-benzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 16-hexamethylene diisocyanate, 1,4-tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-dimethyldiphenylmethane-4,4'-diisocyanate and 3,3'-dimethyldiphenylmethane-4,4'-diisocyanate; the triisocyanates such as 4,4',4"-triphenylmethane triisocyanate polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

The polyisocyanates are prepared by conventional methods known in the art such as the phosgenation of the corresponding organic amine. Included within the useable isocyanates are the modifications of the above isocyanates which contain carbodiimide, allophonate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test as described by Kohler in Journal of the American Chemical Society, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

The isocyanate component (I) and the polyol component (II) will generally be combined in an index of from 60 to 120, and preferably an index of from 80 to 110. The most preferred index for the polyurethane composition will be from 85 to 95.

The polyurethane composition of the invention maybe used with various reinforcement materials to produce SRIM articles in both conventional SRIM processes and pour behind processes.

As indicated above, conventional SRIM processes generally require the pouring of a liquid polyurethane composition into an open or closed mold, which, if open, is subsequently closed during the foaming reaction. Prior to the pouring in of the liquid foam composition, reinforcing materials and/or reinforcing parts are placed in the open mold. Reinforcement materials suitable for use in producing SRIM articles include a wide variety of materials. Fiber reinforcements are preferred. Fiber materials may be woven, non-woven (random), or combinations thereof. Suitable fibers include synthetic fibers of nylon, polyester, aramide, polyether ketones, polyether sulfones, polyamides, silicon carbon, and the like; natural fibers such as cellulose, cotton, hemp, flaxes, and jute; and mineral or ceramic fibers including Wollastonite, aluminum, glass fibers, and carbon fibers. A unique non-glass material is Colback®[4] spun bonded non-woven comprised of a biocomponent fiber having a polyester core and polyamide skin available from AKZO Corporation, Enka, N.C. Glass fiber, either woven or non-woven, is the preferred reinforcement material due to its low cost and physical properties.

[4] Colback® is a registered trademark of AKZO Corporation.

One or more layers of fiber reinforcement may be used depending on the desired fiber weight. Up to 70 weight percent of the SRIM part may comprise reinforcement material. In general, the reinforcing material will laid directly into the mold and the liquid polyurethane foam composition poured thereon. However, alternatively or in addition thereto, chopped fibers and other fillers may be added to the isocyanate component of the system, the polyol component, or both, in amounts up to about 70 weight percent of the SRIM part.

However, SRIM processes wherein fiberglass mats are placed in the mold prior to the injection of the polyurethane composition are preferred.

In addition to the fiber reinforcing material, structural parts or elements comprised of wood, metal and/or plastic type materials known to those skilled in the art, may be laid in the mold either prior to or subsequent to the placing of the fiber reinforcement in the open mold. Metal and plastic elements are preferred. Examples of suitable plastic materials include ABS, nylon, acetyl, polypropylene, polyethylene, PVC and the like. In either case, the liquid polyurethane foam composition will generally be applied last, prior to the closing of the mold or the initiation of molding.

In traditional SRIM processes, after the molding of the SRIM article, the article will be trimmed. However, in some uses the molded SRIM article will be used as a component for a composite article. For example, a cover stock material may be laid into a open mold, followed by the molded SRIM article. A flexible or semi-flexible polyurethane foam is then injected into the mold containing the cover stock material and the molded SRIM article. The flexible or semi-flexible foam is allowed to react to bind the cover stock and the molded SRIM article into a single composite article.

Alternatively, composite articles can be made using backfilling or pour-behind processing techniques. For example, in a typical pour-behind process a cover stock material is laid into a foam. Such cover stocks may or may not have expanded foam backing. Optionally, a second foam such as an energy absorbing foam may be placed in the top of the mold. Alternatively, reinforcing materials may be placed in the mold. The liquid polyurethane composition is subsequently poured onto the cover stock and molding initiated. In an open mold, molding will be initiated by closing the mold. The foam is allowed to react for a period of time sufficient for it to completely react and adhere to the cover stock material and any other component elements previously placed in the mold.

Examples of suitable cover stock materials are vinyl, polyvinyl chloride, polypropylene, polyethylene, cloth, polyurethane foams, including both rigid, flexible, semi-flexible and energy absorbing, and mixtures thereof. Those skilled in the art will appreciate that with respect to backfilling SRIM processes, cover stock materials are often referred to as 'vinyl' whether or not they are comprised of polymeric ethylene. As used herein, the term vinyl is intended to encompass both the traditional chemical meaning, (i.e., polymeric ethylene) as well as the meaning typically given to those familiar with SRIM molding process.

The cover stock materials may be formed prior to their insertion into the composite article mold by vacuum forming. Alternatively, cover stock material may be formed of PVC which is been rotationally cast. As discussion of such processes may be found in the Polyurethane Handbook, G. Oretal, Section 5.4, pages 223–225 hereby incorporated by reference.

It will be appreciated that the presence of the various internal component elements requires that the internal mold release agent not interfere with adhesion of the SRIM article thereto.

The molded SRIM articles having internal mold release properties of the invention will generally have densities of from 10 to 30 without glass and from 15 to 40 with glass. More preferably, the densities of the SRIM articles of the invention all have densities from 20 to 35. They are further characterized by warpage of no more than approximately 0.25 percent to 0.75 percent and a dimensional stability of no more than 0.10 at 38° C. and 100% RH. Dimensional stability at 24 hours and 70° C. is no less than 0.01 percent. Tensile strength of the molded SRIM articles ranges from 2000 psi to 4000 psi. The flexule strength is from 3000 psi to 7000 psi and the flexule modules is from 100 Kpsi to 200 Kpsi. The molded articles show no cracking and an impact resistance of 0.9 J at 23° C.

The following working examples indicate the manner and process of making and using the invention and set forth the best mode contemplated by the inventors of carrying out the invention, but are not to be construed as limiting.

The following ingredients were employed to illustrate the various compositions of the invention:

Polyol A is a propylene oxide adduct of vicinal toluenediamine having an OH number of 390.

Polyol B is a propylene oxide adduct of glycerin having an OH number of 398.

Polyol C is a propylene oxide adduct of sucrose/diethylene glycol having an OH number of 397.

Polyol D is a propylene oxide adduct of glycerin having an OH number of 935.

Polyol E is a polyester polyol having an OH number of 65.

DABCO® 8800 is a delayed gel catalyst commercially available from Air Products Corporation.

POLYCAT® SA-1 is a delayed blow catalyst commercially available from Air Products.

Dow Corning® Fluid 5000 is a silicon-containing polymer commercially available from Dow Corning or Air Products Corporation.

FOMREZ®[5] UL-32 is a dioctyltin dimercaptide catalyst commercially available from Witco Corporation.

[5]FOMREZ® is a registered trademark of Witco Corporation.

LEXOREZ®[6] 1721-65 is an adhesion promoter commercially available from Inolex Corporation.

[6]LEXOREZ® is a registered trademark of Inolex Corporation.

TEGOSTAB® B 8863Z is a cell stabilizer commercially available from Goldschmidt Chemical.

XFK-1546® is a silicone surfactant commercially available from Air Products Corporation and believed to be equivalent to DC-5000.

PALATINOL®[7] 11P-E is di-undecyl phthalate and is commercially available from BASF Corporation.

[7]PALATINOL® is a registered trademark of BASF AG.

EP-8 is an epoxidized tallate commercially available from Union Carbide.

DRAPEX®[8] 6-8 is an epoxidized soybean oil commercially available from Witco.

[8] is a registered trademark of Witco Corporation.

Isocyanate A is a polymeric-MDI having about 45–47 weight percent, 2-ring MDI; 19 weight percent 3-ring MDI; and 30–33 weight percent n-ring MDI oligomers where n>3. The isocyanate has an NCO content of 31.6 weight percent.

EXAMPLE 1

The following example illustrates the unexpected results achieved with the internal mold release composition of the invention.

Three polyol components were prepared having the formulations indicated below:

POLYOL COMPOSITIONS

| FORMULATION | A | B | C |
|---|---|---|---|
| POLYOL A P736 | 50.70 | 50.70 | 50.70 |
| GLYCERIN | 5.00 | 5.00 | 5.00 |
| $H_2O$ | 3.00 | 3.00 | 3.00 |
| SA-1 | 0.40 | 0.40 | 0.40 |
| DABCO 8800 | 1.30 | 1.30 | 1.30 |
| FOAMREZ UL-32 | 0.04 | 0.04 | 0.04 |
| LEXORE Z 1721-65 | 2.00 | 2.00 | 2.00 |
| DC-5000 | 3.20 | 3.20 | 3.20 |
| EP-8 | 30.0 | — | — |
| PALATINOL 11P-E | — | 30.0 | — |
| DRAPEX 6-8 | — | — | 30.0 |
| TEGOSTAB B8863Z | 3.0 | 3.00 | 3.00 |

Each of the above polyol compositions A, B, and C were combined with isocyanate A at an index of 110, i.e. 100 parts polyol to 110 parts isocyanate to form three different polyurethane compositions A, B, and C.

For each SRIM part, a fiberglass mat weighing between 200 to 300 grams was used, with the average mat weighing approximately 222 grams. The fiberglass used was 1 ounce NICO 754.

The parts were molded in an EMB PU SV, a high pressure dispensing machine. The mold used was a door mold and had a metal surface and internal heating coils. The temperature of the mold surface was approximately 150° F. The internal temperature of the shut mold was 150° F. For each part run, the mold, having an approximate part dimension of 2×3 feet, was charged with the above polyurethane compositions, each component, i.e. the isocyanate (I) or the polyol side (II) having a temperature of 80° F.

The intention was to mold as many parts as possible until the quality of release was deemed unacceptable; i.e. failed to lift out easily and rapidly.

The mold surface was initially prepared by stripping with solvent followed by a soap (Ivory bar soap) and water wash. This was followed by an initial application of a light coat of LH-1, a hydrocarbon based wax, commercially available from Chemtrend of Howell, Mich. Five passes of the filling arm were necessary to fill the mold. It took approximately 14 seconds to clamp the mold. Cure occurred 60 seconds after clamp.

| POLYURETHANE COMPOSITION | # OF RELEASES BEFORE QUALITY OF RELEASE DEEMED UNACCEPTABLE |
|---|---|
| A | 18-20 |
| B | 40-45 |
| C | 6-8 |

The results indicate that the polyurethane composition of the invention, i.e. composition B, performs advantageously as compared to prior art compositions.

EXAMPLE 2

The effect of compounds (a) and (b) alone as compared to (a) and (b) together was measured. The following polyol compositions were prepared.

| FORMULATION | 1 | 2 | 3 |
|---|---|---|---|
| POLYOL A | 58.30 | 58.30 | 58.30 |
| PALINTOL 11P-E | 25.00 | — | 25.00 |
| GLYCERINE | 10.00 | 10.00 | 10.00 |
| DMCHA | 0.80 | 0.80 | 0.80 |
| BL-19 | 0.20 | 0.20 | 0.20 |
| METHYL IMIDAZOLE | 0.20 | 0.20 | 0.20 |
| LEXOREZ 1721-65 | 2.00 | 2.00 | 2.00 |
| DC-5000/DC 1245 | 2.25 | 2.25 | — |
| WATER | 1.25 | 1.25 | 1.25 |

The above polyol compositions, 1, 2, and 3 were combined with iso A at an index of 100 to form polyurethane compositions 1, 2, and 3. Plaques were handmade using a 12"×12"×0.25" aluminum mold initially prepared by stripping with solvent followed by a soap (Ivory bar soap) and water wash. This was followed by two coats of LH-1, a hydrocarbon based wax, commercially available from Chem-Trend of Howell, Mich.

A fiberglass mat weighing between 200 to 300 grams was used, with the average mat weighing approximately 222 grams. The fiberglass used was 1 ounce NICO 754.

The intent was to mold successive plaques until unacceptable sticking occurred.

Fifteen successive plaques were molded using polyurethane composition No. 1. All 15 releases including the last one were excellent. Successive molding was stopped using polyurethane composition No. 1 due to a lack of fiberglass mat.

Polyurethane composition No. 2 exhibited poor flow and stuck after the second molding. The resulting partially cured foam had to be stripped from the mold surface.

Three plaques were molded using the polyurethane composition No. 3. The last release was extremely poor and stuck to the mold surface.

Accordingly, neither the presence of silicone (a) alone, (composition No. 2), nor compound (b) alone, (composition No. 3), yielded acceptable results. Rather, it is the unexpected synergy between (a) and (b) which produces an internal mold release agent, i.e. that used in composition No. 1, which yields advantageous results.

EXAMPLE 3

The effect of compound (b) alone as compared to (a) and (b) together was again measured using a different polyol. The following polyol compositions were prepared.

| FORMULATION | 4 | 5 |
|---|---|---|
| POLYOL B | 35.39 | 32.00 |
| POLYOL C | 15.81 | 16.00 |
| POLYOL D | 10.00 | 15.00 |
| GLYCERIN | 5.00 | 5.00 |
| DMCHA | 0.8 | 0.8 |
| X-8154 | 1.30 | 1.30 |
| H2O | 2.50 | 2.50 |
| XFK-1546 | 4.0 | — |
| PALINTOL 11 P-E | 25.00 | 25.00 |

The above polyol compositions 4 and 5 were combined with Iso A at an index of 100 to form polyurethane compositions 4 and 5.

Handmix reactivity was as follows:

| CREAM TIME | 23 SECONDS |
|---|---|
| TOP OF CUP | 46 SECONDS |
| GEL TIME | 56 SECONDS |
| RISE TIME | 62 SECONDS |

Plaques were hand made using a 12"×12"×0.25" aluminum mold. The mold surface was initially prepared by stripping with solvent followed by a soap (Ivory bar soap) and water wash. This was followed by an initial application of a light coat of LH-1, a hydrocarbon based wax, commercially available from Chemtrend of Howell, Mich.

Successive plaques were molded until sticking occurred and application of an external mold release agent became necessary.

10 plaque releases were obtained using polyurethane composition No. 4. Only 2 plaque releases were possible using polyurethane composition No. 5. Plaques made with polyurethane composition No. 5 stuck very badly to the mold surface.

Thus, as a result of the use of the compositions of the invention, the need to spray additional IMR agents is substantially reduced.

The average performance properties of the resulting finished parts produced according to Example 1 and using polyurethane composition Formulation B were as follows:

| PHYSICAL PROPERTIES | VALUE |
|---|---|
| Density (with glass) | 33.7 pcf |
| Foam Density | 26.0 pcf |
| Warpage | .12 |
| Dimensional Stability 38° C. and 100% RH | .05% |
| Dimensional Stability 24 hrs. and 70° C. | .05% |
| Tensile Strength | 2730 psi |
| Flexural Strength | 5180 psi |
| Flexural Modulus | 162,700 psi |
| Impact Resistance 0.9 J and 23° C. | No Cracking |
| Fiber Glass, Wt. | 1 oz/ft$^2$ |

I claim:

1. A process of making a molded polyurethane article having internal mold release properties, the process comprising:
providing a mold;
placing in the mold, a composition comprising:
I.) an isocyanate component; and
II.) an isocyanate-reactive polyol component, comprising:
A.) an isocyanate-reactive polyol comprising a polyoxyalkylene polyether polyol having an amine substituted aromatic molecule as an initiator and having a molecular weight from 100 to about 10,000; and
B.) an effective amount of an internal mold release composition, comprising:
a.) a silicon-containing polymer; and,
b.) an at least diester functional compound which is the reaction product of:
(i) an aromatic dicarboxylic acid; and
(ii) alcohols having from 2 to 30 carbons; and
allowing the composition to react within the mold for a time sufficient to produce a molded polyurethane article having internal mold release properties.

2. The process of claim 1 wherein the polyol (A) is an oxypropylated, toluene diamine-initiated polyol.

3. The process of claim 2 wherein the polyol (A) has a number average molecular weight of from about 400 to 700 and an OH number of from 300 to 500.

4. The process of claim 1 wherein the composition placed in the mold has an internal mold release composition (B) wherein the silicon-containing polymer (a) is a secondary hydroxyl functional polydimethylsiloxane.

5. The process of claim 1 wherein the composition placed in the mold has an internal mold release composition (B) wherein compound (b) comprises the reaction product of:
(i) an aromatic dicarboxylic acid having from 8 to 12 carbons; and
(ii) one or more aliphatic monofunctional alcohols having from 4 to 15 carbons.

6. The process of claim 5 wherein the at least diester functional compound (b) comprises the reaction product of:
(i) an aromatic dicarboxylic acid having from 8 to 12 carbons; and
(ii) one or more aliphatic monofunctional alcohols having from 8 to 11 carbons.

7. The process of claim 6 wherein the at least diester functional compound (b) comprises the reaction product of:
(i) an aromatic dicarboxylic acid selected from the group consisting of phthalic acid, terephthalic acid, and isophthalic acid; and
(ii) an aliphatic monofunctional alcohol having from 8 to 11 carbons.

8. The process of claim 7 wherein compound (b) is di-undecylphthalate.

9. The process of claim 1 further comprising placing a fiberglass mat within the mold.

10. The process of claim 1 wherein the composition is allowed to react within the mold for less than one minute.

11. A method of making a composite molded article, comprising:
placing within a composite article mold, a cover stock;
subsequently placing within the composite article mold, a molded polyurethane SRIM article having internal mold release properties, the SRIM article being produced by the process comprising:
providing an SRIM article mold;
placing in the SRIM article mold, a polyurethane SRIM composition comprising:
I.) an isocyanate component; and
II.) an isocyanate-reactive polyol component, comprising:
A.) an isocyanate-reactive polyol comprising a polyoxyalkylene polyether polyol having an amine substituted aromatic molecule as an initiator and having a molecular weight from 100 to about 10,000; and
B.) an effective amount of an internal mold release composition, comprising:
a.) a silicon-containing polymer; and,
b.) an at least diester functional compound which is the reaction product of:
(i) an aromatic dicarboxylic acid; and
(ii) alcohols having from 2 to 30 carbons; and
allowing the composition to react within the mold for a time sufficient to produce a molded polyurethane SRIM article having internal mold release properties; and
removing the SRIM article from the mold;
providing within the composite article mold, a polyurethane foam composition; and
allowing the polyurethane foam composition to react inside the composite article mold for a time sufficient to produce a composite molded article.

12. The method of claim 11 wherein the polyurethane foam composition is a flexible foam composition and is positioned so as to join the cover stock to the SRIM article.

13. The method of claim 12 wherein the flexible foam composition is between the cover stock and the SRIM article.

14. The method of claim 12 which produces a composite molded article which exhibits no significant reduction in adhesion between the flexible foam and the cover stock.

15. The method of claim 11 wherein placing a cover stock within the composite article mold comprises placing a cover stock selected from the group consisting of vinyl, polyvinyl chloride, polypropylene, polyethylene, cloth, polyurethane foam, and mixtures thereof.

16. The method of claim 11 wherein placing an SRIM article within the composite article mold comprises: placing within the composite article mold an SRIM article produced by the process further comprising providing within the SRIM article mold a fiber glass mat.

17. The method of claim 11 wherein the SRIM composition placed in the mold has an internal mold release composition (B) wherein the at least diester functional compound (B) comprises the reaction product of:

(i) an aromatic dicarboxylic acid having from 8 to 12 carbons; and (ii) one or more aliphatic monofunctional alcohols having from 4 to 15 carbons.

18. The method of claim 17 wherein the SRIM composition placed in the mold has an internal mold release composition (B) wherein compound (b) comprises the reaction product of:

(i) an aromatic dicarboxylic acid having from 8 to 12 carbons; and (ii) one or more aliphatic monofunctional alcohols having from 8 to 11 carbons.

19. The method of claim 18 wherein the SRIM composition placed in the mold has an internal mold release composition (B) wherein the reaction product of:

(i) compound (b) comprises an aromatic dicarboxylic acid selected from the group consisting of phthalic acid, terephthalic acid, and isophthalic acid; and (ii) an aliphatic monofunctional alcohol having from 8 to 11 carbons.

20. The method of claim 19 wherein the SRIM composition placed in the mold has an internal mold release composition (B) wherein compound (b) is di-undecylphthalate.

* * * * *